United States Patent Office 3,211,275
Patented Oct. 12, 1965

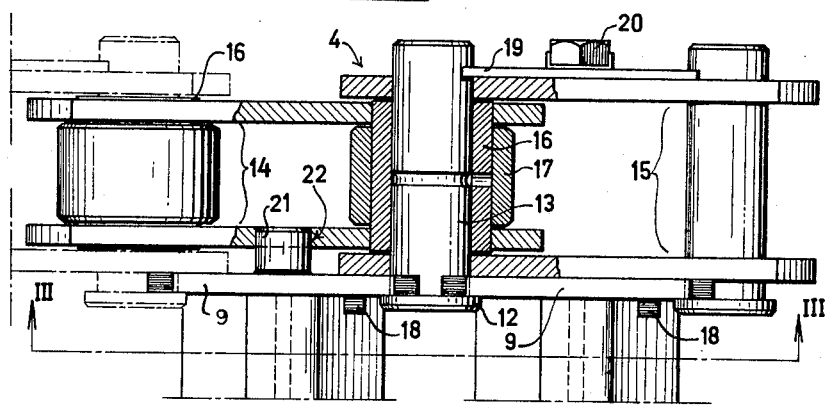
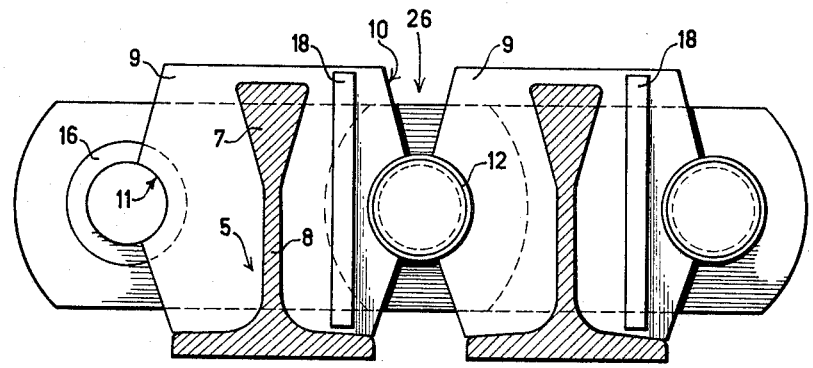

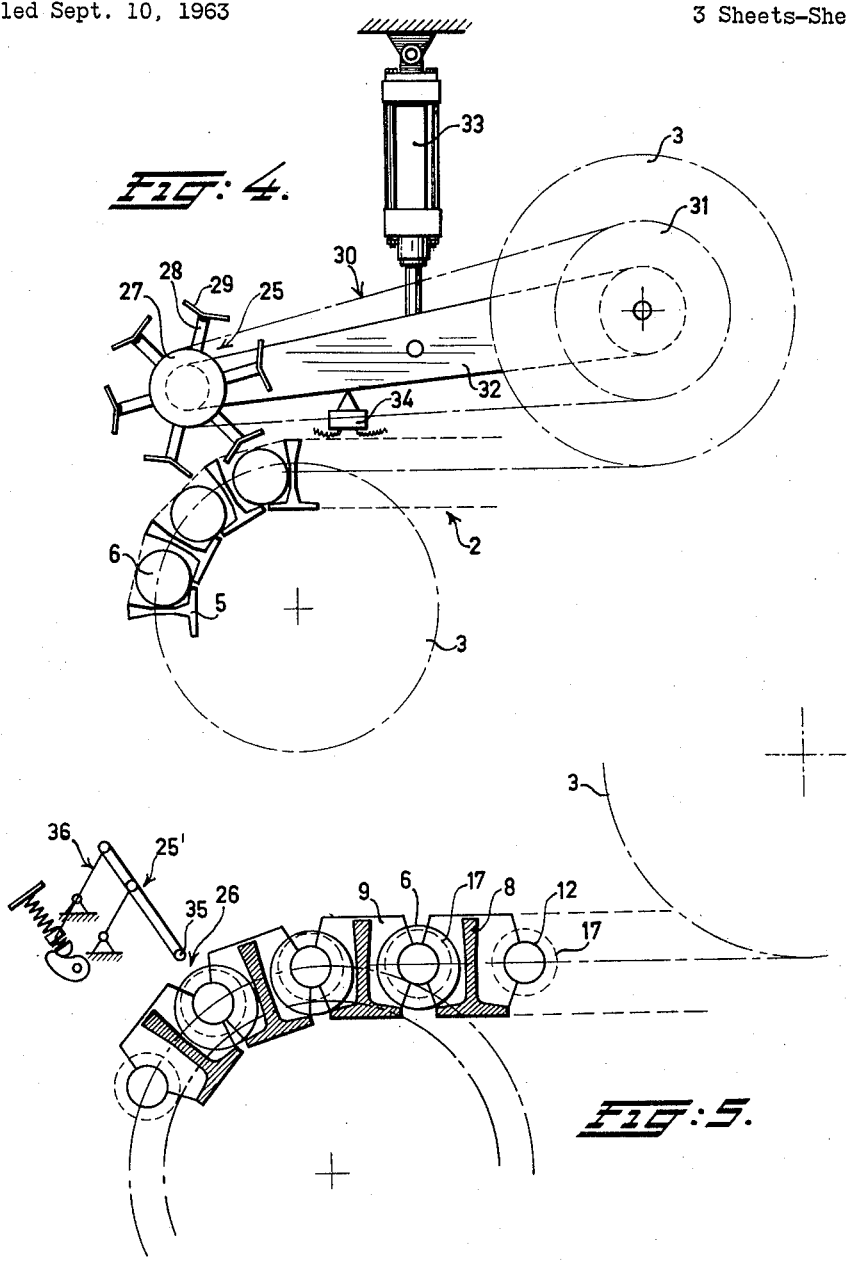

3,211,275
APPARATUS FOR THE STERILIZATION AND PASTEURIZATION OF COMMODITIES IN CONTAINERS
Johannes B. van der Winden, Amstelveen, Netherlands, assignor to Gebr. Stork & Co's Apparatenfabriek N.V., Amsterdam, Netherlands
Filed Sept. 10, 1963, Ser. No. 307,957
Claims priority, application Netherlands, Sept. 11, 1962, 283,114/62
11 Claims. (Cl. 198—131)

The invention relates to apparatus for the sterilization or pasteurization of commodities packed in containers, especially tinned foodstuffs, the said apparatus comprising a conveyor consisting of at least two parallel endless chains, which are interconnected by transverse rods, each pair of rods constituting a carrying element for the containers at both ends of each carrying element there is secured a closing disc. The aforesaid device is well known in the art.

It is an object of the invention to provide a simplification of the construction of the conveyor in such a device in order to accelerate and facilitate the often time consuming job of mounting and dismounting the conveyor.

It is a further object of the invention to provide an apparatus in which the conveyor can be assembled by "stringing" the various elements on the pivot pins, and to complete the mounting by providing a conventional locking member for the pivot pin. The invention also relates to important simplifications in dismounting.

A further object of the invention is to provide carrying elements, which constitute an open bucket for the conveyed containers, which may be made from a rolled profile, thereby reducing the cost of the installation. In addition, the invention aims at centering the containers in the inner space of each carrying bucket by forming a slope, which for each position of the filled bucket traveling along the path of the conveyor, prevents the containers from "roaming" in the bucket and from falling therefrom.

As a result of the proportionally skeleton-like construction of each carrying bucket, it becomes possible to check automatically and mechanically the correct position of the containers in the conveyor. Such an inspection is of great practical importance since jamming of the conveyor and/or deformation of a container in the interior of the installation is avoided thereby. The invention further aims at effecting such control by arranging a feeler at the location of a non-vertical and preferably curved portion of the conveyor path, said feeler being movable within the space in the buckets to sense any improper position of the containers.

It is a further object of the invention to provide easy adaptation of the feeler for various size containers.

The foregoing and other objects and advantages of the invention will appear in the following description taken in conjunction with the accompanying drawing, in which there is shown by way of illustration and not of limitation, a specific embodiment of the invention.

In the drawing:

FIGURE 1 diagrammatically illustrates the entire apparatus;

FIGURE 2 is a side elevation on an enlarged scale of a small portion of the conveyor of the apparatus according to FIGURE 1;

FIGURE 3 is a cross section taken along the line III—III in FIGURE 2;

FIGURE 4 is a diagrammatical illustration of a first embodiment of a feeler; and FIGURE 5 is a diagrammatical illustration of a modified embodiment of the feeler.

Figure 1:
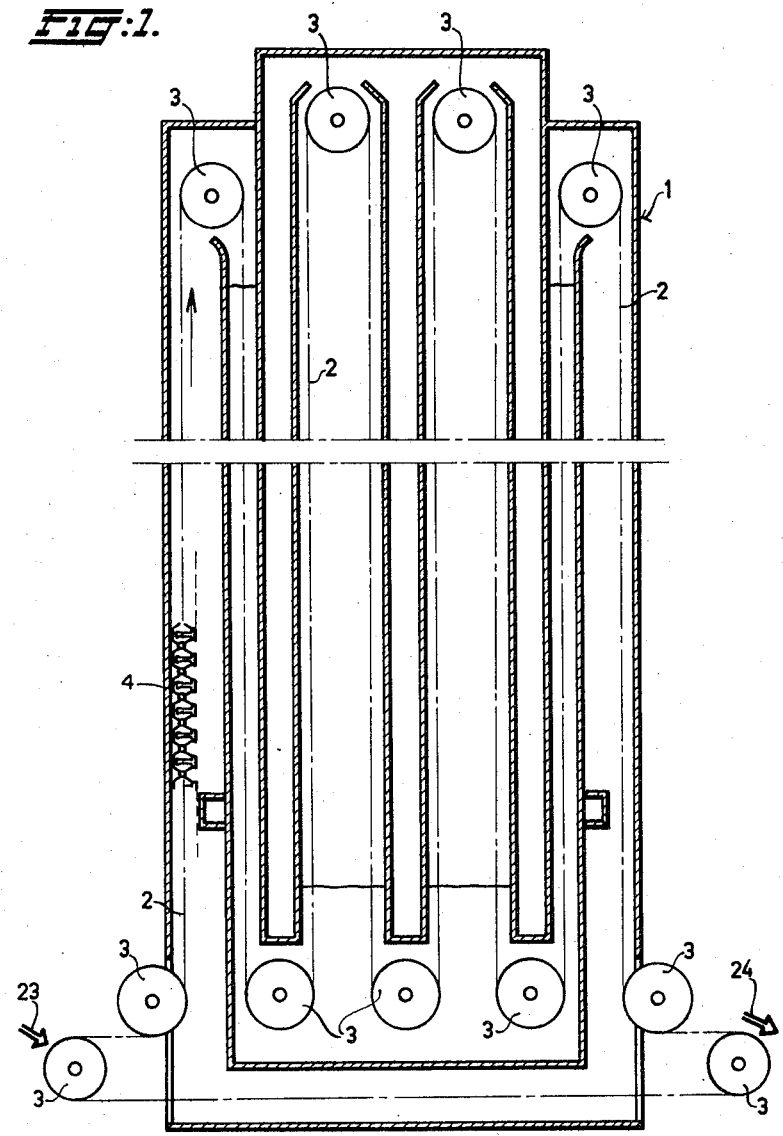

As visible in FIG. 1, the apparatus consists of a casing 1 in which a conveyor 2 is accommodated, which by way of sprocket wheels 3 travels along a loop shaped path within the casing 1. This conveyor 2 consists of two parallel endless chains 4, only one of which is represented in FIG. 1, one chain being shown on an enlarged scale in FIG. 2. These chains 4 are interconnected by T-shaped rods 5. Between adjacent rods 5 may be supported containers 6. Thereby adjacent rods 5 constitute carrying elements or carrying buckets for the accommodation of the containers 6. The containers 6 may contain foodstuffs or the like which are pasteurized or sterilized upon passage of the containers through the casings.

As visible in FIG. 3 each carrying element 5 has a substantially T-shaped cross section, the central leg 8 of the T having a thickened end 7. Secured to both ends of each T-shaped rod 5 is a closing disc 9, which has a side 10, facing the corresponding side of adjacent disc 9. There is provided a recess 11 centrally in each side in the shape of an arc of a circle. Inclined surfaces extend from the recess 11 to form upper and lower V-shaped openings as seen in FIG. 3. The said recess accommodates a head 12 of a pivot pin 13, the latter serving to connect the two adjacent links 14 and 15 of the chain 4. The link 14 is narrow while the link 15 is broad as is usual in this type of chain. The spacing between the two recesses 11 in each closing disc 9 is equal to the pitch length of the links of the chain 4. Disposed in conventional manner about the pivot pin 13 is a sleeve 16 around which a roller 17 is mounted for rotation, the said roller cooperating with the sprocket wheels 3 for the driving of the chain.

Two T-shaped rods 5 together with the intermediate portions of the closing discs 9 constitute a carrying element or bucket in the interior of which the containers to be treated are supported (see FIGURES 4 and 5). The oppositely situated inclined surfaces of the sides 10 of the discs 9 are inclined such that in the stretched position of the conveyor (shown in FIG. 3), these surfaces form an angle of about 30° for the upper opening and about 40° for the lower opening. Thus, as shown by FIG. 3 the V-shaped angle above pivot pinhead 12 is 30° and below 12 is 40°. These angles form a limitation of the pivotal movement between the two consecutive links 14 and 15. Thereby, in case a loop is sagging, as for example, in the event a conveyor is only partially filled with containers, there is avoided the possibility that the links of the chain at the lower end of the loops represented in FIG. 1 would mutually pivot enough to permit a container to pass between the flanges of two adjacent T profiles and be deformed during the consequent stretching of the chain 4. Moreover, this could interfere with the return movement of the chain from the curved to the stretched position.

Due to the 30° angle the chains will form a lower curve of 180° consisting of six links. Naturally, this angle of 30° is determined in dependence on the width of the flanges of the T-shaped rods 5 and the dimensions of the containers 6 to be treated.

Mounted on the surface of each closing disc 9 which faces away from the chain, is an abutment strip 18, which projects from the latter surface a distance which is at least equal to the amount of projection of the end 12 of the pivot pin 13. Due to this feature the folded edge around the front face of a container 6, situated at the end of the bucket formed by two carrying elements, is prevented from being engaged with the abovementioned projecting end 12 of the pivot pin 13, since the container first comes in contact with the abutment strip 18. At its opposite end this pivot pin 13 is fixed in a conventional way by means of a locking plate 19 and a screw bolt 20.

The installation of this locking plate 19 requires that the link plates of the broad link 15 be non-rotative with respect to pin 13 whereas the link plates of a narrow link 14 be rotative with respect to the pivot pin 13 (FIG. 2). As a result, there will appear a clearance space in the narrow links but not in the broad links. In order to restrict the appearance of space and the unfavorable influence thereof as much as possible, the two chains 4 are staggered with respect to each other, so that each T-shaped rod 5 is situated with one end adjacent a narrow link 14 and its other end adjacent a broad link 15. On the outer side of each closing disc 9, situated adjacent a narrow link 14, there is secured a pin 21, which exactly fits in a hole 22 of the adjacent link plate.

As visible in FIG. 1 the feeder station 23 of the containers is on one side of the apparatus, whereas the discharge station 24 is situated on the opposite side thereof. Both the feeder and the discharge station are situated at a location of the curved portion of the conveyor path, so that the buckets of this location formed by two adjacent carrying elements "gape" so that a sufficiently wide opening is available for feeding, and discharging a row of containers respectively. Each bucket can hold about twenty containers at a time. In the stretched portions of the conveyor path the containers 6 lie in a central position in the bucket, said containers tending to maintain this position because of the thickened ends 7 of the leg 8 of each T-shaped rod 5. This central position is advantageous with respect to the load of the chains 4 and the carrying elements 5, since in this way a tilting torque is prevented.

As visible in FIG. 4 at the location of a non-vertical and preferably curved portion of the path of the conveyor 2, there is arranged a feeler 25 which is capable of periodic movement into the space 26 between the inner faces of the closing discs 9 of opposite chains and between change "carrying" to T-shaped two adjacent carrying rods 5 associated with said discs. This intermediate space 26 extends for the entire distance between the discs 9. The containers 6 which are in the bucket are in their most inwardly shifted position which is due to the force of gravity. The feeler 25 has a hub 27, which is driven in synchronization with the conveyor 2, the hub having radially protruding feeler arms 28, which at their ends are provided with roof shaped strips 29. The drive of the hub 27 is effected by way of a chain transmission 30, which is driven by a chain wheel 31 axially disposed in respect to a sprocket wheel 33. By the proper choice of the diameter of the wheel 31, it is possible to achieve the adaptation of the circumferential speed of the ends at the feeler arms 28 formed by the strips 29, with respect to the speed of the conveyor 2.

The feeler element 25 is mounted on a rod 32, which is pivotally supported on an axis coaxial with the chain wheel 31. The rod 32 is supported in such manner by way of a pneumatic cylinder 33 that it is in neutral equilibrium. Finally, the rod 32 cooperates with an electrical switch 34 which closes upon the pressure of rod 32. The switch 34 is incorporated in the current supply to the driving gear of the conveyor 2 and thereby controls the drive thereof. The feeler arms 28 are detachably secured in the hub 27 and have the ability of various size adaptation for the treatment of containers.

The operation of the feeler 25 is as follows. As the conveyor 2 advances, one feeler arm 28 with a strip 29 moves into the space 26 of a bucket formed by two adjacent carrier elements 5. The adjustment is such that in the correct placement of the containers 6, there is a free space of a few millimeters between these containers and the strip 29. In this way, the undisturbed movement of the feeler element 25 is not hampered and the rod 32 remains in the position represented in FIG. 4.

When one or more containers 6 do not assume the correct position in a bucket (for instance when they are transverse of the desired position) a strip 29 will strike such container, whereby the rod 32 will be sligthly tilted (lifted), so that the switch 34 is opened and the drive of the conveyor 2 is interrupted. The rod 32 remains in its lifted position due to the action of the pneumatic cylinder 33. The operator can now correct the position of the container. If the rod 32 is now lowered, the switch 34 will be closed, so that the drive of the conveyor is resumed. In this way, the unhampered operation of the apparatus is guaranteed, and obstruction due to the wrong position of a container is prevented.

Shown in FIG. 5 is a modified embodiment of a feeler 25a. This consists of a rodlike member 35 which by way of a diagrammatically represented mechanism 36 is periodically movable in a direction transverse to the direction of movement of the conveyor 2. The mechanism 36 and the conveyor 2 are driven in synchronization and the effect of this safeguard is analogous to that of the provisions according to FIG. 4.

An important advantage of the construction of the conveyor according to the invention consists in the considerable simplification in mounting and dismounting, as the assemblage of the conveyor can simply be effected by successively stringing in correct succession, the elements of which the conveyor is composed, for example, the plates, sleeves, roller and carrier elements on the pivot pins 13.

While preferred embodiments of the invention have been shown and described, it is to be understood that changes and variations may be made without departing from the spirit and scope of the invention as defined in the appended claims.

What I claim is:

1. Apparatus for the sterilization and pasteurization of commodities packed in containers, said apparatus comprising a conveyor including at least two parallel endless chains; transverse rods interconnecting said chains, said rods being arranged such that each pair of adjacent rods constitutes a carrying element for containers, each rod having opposite ends, a closing disc secured to each of the ends of each rod, each rod having a substantially T-shaped cross section with a central leg having a thickened end, each closing disc having opposite sides which are in adjoining relation with the sides of adjacent discs, said sides having a central recess in the form of an arc of a circle and inclined surfaces extending from said central recess such that the surfaces of adjacent discs define upper and lower V-shaped openings, each chain including pivot pins engaged in the recesses in the sides of adjacent discs for cooperating with and retaining the discs in engagement with the chains.

2. Apparatus as claimed in claim 1 further comprising feeler means positioned adjacent the conveyor for movement to a position between adjacent rods of each carrying element for sensing the position of containers carried thereby.

3. Apparatus as claimed in claim 2 wherein said conveyor extends along a path having straight and curved lengths, the feeler means being located adjacent a curved length of the conveyor.

4. Apparatus as claimed in claim 3 wherein said feeler means comprises a hub driven in synchronization with said conveyor and feeler arms extending radially from said hub and rotating at a circumferential speed equal to the velocity of said conveyor for entry between adjacent rods to contact and sense the position of containers carried thereby.

5. Apparatus as claimed in claim 4 wherein said feeler means comprises a pivotally supported rod, said hub being mounted on said rod, the apparatus further comprising switch means for controlling the drive of the conveyor, said rod being positioned relative to said switch means to normally hold the same in closed position, but opening said switch means in response to the sensing by a feeler arm of an improper position of a container in the carrying element.

6. Apparatus as claimed in claim 5 wherein said feeler arms are detachably secured to the hub.

7. Apparatus as claimed in claim 3 wherein said feeler means comprises a rod member and means supporting said rod member for periodic transverse displacement between rods of the carrying elements to contact and sense the position of containers carried thereby.

8. Apparatus as claimed in claim 1 wherein the closing discs have surfaces facing away from the associated chain, said pivot pins of said chains including heads which project beyond the latter surfaces of the closing discs, the apparatus further comprising abutment strips on said latter faces of the closing discs projecting a distance therefrom greater than that of the heads of the pins.

9. Apparatus as claimed in claim 8 wherein adjacent links of each chain are alternately narrow and broad, the links of said two parallel endless chains being staggered with respect to each other such that the closing discs on the ends of each rod are respectively situated adjacent a narrow link of one chain and a broad link of the other chain.

10. Apparatus as claimed in claim 9 wherein each closing disc situated adjacent a narrow link comprises a pin, the adjacent link including a link plate provided with a hole, said pin being engaged in said hole.

11. For use with at least two parallel chains of a conveyor for supporting containers: a carrying element adapted to be secured to said conveyor between said chains for being advanced thereby, said carrying element comprising a pair of adjacent rods, each having opposite ends, said rods having a T-shaped cross section including a central leg with a thickened end, and a closing disc secured to each of the ends of the rods, each said closing disc having opposite sides, one of which is adjacent the corresponding side of the closing disc of the other rod, said sides having a central recess in the form of an arc of a circle and inclined surfaces extending from said central recess such that the surfaces of adjacent discs define upper and lower V-shaped openings, said side discs being adapted for being supported from said chains by the engagement of pins of said chains in the recesses of the side discs.

References Cited by the Examiner
UNITED STATES PATENTS
2,243,879   6/41   Meyer _____ 198—31

SAMUEL F. COLEMAN, *Primary Examiner.*
WILLIAM B. LA BORDE, *Examiner.*